(12) United States Patent
Schmitzer et al.

(10) Patent No.: US 7,355,410 B2
(45) Date of Patent: Apr. 8, 2008

(54) HANDHELD SCANNING SUBSURFACE DETECTOR

(75) Inventors: Harald Schmitzer, Werdenberg (CH); Christoph Würsch, Werdenberg (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/407,411

(22) Filed: Apr. 19, 2006

(65) Prior Publication Data

US 2006/0255808 A1    Nov. 16, 2006

(30) Foreign Application Priority Data

May 10, 2005   (DE)   .................. 10 2005 000 053

(51) Int. Cl.
*G01R 33/06* (2006.01)
(52) U.S. Cl. ...................... 324/326; 324/235
(58) Field of Classification Search ..............
324/207.12–207.26, 67, 326, 235, 228, 260, 324/262
See application file for complete search history.

(56) References Cited

U.S. PATENT DOCUMENTS

| | | | | |
|---|---|---|---|---|
| 5,296,807 A | * | 3/1994 | Kousek et al. | ............... 324/235 |
| 5,541,965 A | * | 7/1996 | Daffara | ................. 375/326 |
| 5,619,136 A | * | 4/1997 | Drury | ................. 324/242 |
| 6,119,526 A | * | 9/2000 | Reigstad et al. | ............ 73/803 |
| 6,373,244 B1 | * | 4/2002 | Nipp | ................. 324/235 |
| 6,541,965 B1 | * | 4/2003 | Binder et al. | ............. 324/243 |
| 2006/0255789 A1 | * | 11/2006 | Wuersch et al. | ............. 324/67 |

FOREIGN PATENT DOCUMENTS

| | | |
|---|---|---|
| WO | WO 2063343 A1 * | 8/2002 |
| WO | WO03073133 A1 * | 9/2003 |

* cited by examiner

*Primary Examiner*—Jay M Patidar
(74) *Attorney, Agent, or Firm*—Abelman, Frayne & Scwab

(57) ABSTRACT

A handheld scanning subsurface detector (1) includes a detector module (2) and a computing unit (3) located in handheld housing (5), a guide (7) for guiding the detector module (2) at a predetermined distance over a to-be-analyzed wall surface (6), at least one path sensor (8) connected to the computing means (3) and connected, in a controlling manner, to the detector module (2) by controlling means (9). A corresponding control method is also described.

16 Claims, 3 Drawing Sheets

HANDHELD SCANNING SUBSURFACE DETECTOR

BACKGROUND OF THE INVENTION

1. Field of the Invention

The present invention relates to a handheld scanning subsurface detector, particularly for detecting reinforcements or lines embedded in concrete or masonry, and to an associated control method.

2. Description of the Prior Art

The detection of embedded objects plays an important role in the constructional industry for detecting iron reinforcements, metal pipes, electric lines, or plastic conduits. The detection measurement methods upon which the subsurface detection is based are not the subject matter of the present application and will not be discussed in detail. Generally, embedded objects are detected and identified by changes in the impedance of an impressed magnetic near-field, e.g., according to U.S. Pat. No. 6,541,965, by changes in the impedance of an impressed electric near-field according to WO02063343, or electromagnetically by radar according to U.S. Pat. No. 5,541,965.

Subsurface detectors which scan along a scanning direction depend upon a reliable detection of path differences on wall surfaces which, in the constructional industry, are usually course and rough. By wall surface is meant, within the meaning of the invention, surfaces of walls, ceilings, floors, etc. which are at least partially planar.

U.S. Pat. No. 5,296,807 discloses a subsurface detector of the type mentioned above for embedded, one-dimensional objects and including a handheld measuring head which is movable in a scanning manner over a surface and which includes a detector module for an impressed magnetic nearfield, a path sensor, and a spatially separate image-generating evaluating unit which is connected to the measurement head so as to enable transmission of signals. The four guide wheels of the subsurface detector, which are spaced from one another, are connected in pairs by rigid axles to one another and to the latter by a toothed belt so as to be fixed without a possibility of rotation relative to each other so that the measuring head is always compulsorily guided along a straight line. The path sensor, which is likewise driven by the toothed belt and is constructed as an incremental sensor, is sensitive to the movement of the guide wheels. The spatial data detected by the path sensor and the detection data which are continuously detected by the detector module, are calculated in a separate evaluating unit with computing means and the results are displayed on a graphic display.

According to German Publication DE10207477, a subsurface detector of the type mentioned above and having a detector module and computing means within a handheld housing and a graphic display, is moved back and forth in a scanning manner in one dimension over the to-be-analyzed wall surface. The relative path change is detected along one scanning direction by a path sensor and is processed by the computing means of the subsurface detector. The four guide wheels of the subsurface detector which are spaced from one another are connected to one another in pairs by rigid axles without a possibility of rotation relative to each other. When the guide wheels are lifted, resulting in erroneous measurements, this is detected by the path sensor that triggers an error report that is presented to the user. Nevertheless, detection measurements are still possible when the guide wheels are partially or completely lifted from the subsurface.

It is the object of the invention to realize a handheld scanning subsurface detector which reliably prevents a detection measurement when the guide means are partially or completely lifted off the substrate, and an associated control method.

SUMMARY OF THE INVENTION

This and other objects of the present invention, which will become apparent hereinafter, are achieved with a handheld scanning subsurface detector with a detector module and computing means arranged within a handheld housing that also has guide means which are designed to guide the detector module at a predetermined distance over a to-be-analyzed wall surface, and which has at least one path sensor that is connected to the computing means and is connected to the detector module in a controlling manner by controlling means.

In the associated control method for a handheld scanning subsurface detector, the path of the guide means measured by the path sensor is detected repeatedly in a scanning step so that the position of the detector module at the wall surface can be determined by using spatial data, and a detection measurement is carried out, in a detection step, by the detector module, so that objects embedded in the substrate can be detected using detection data before the detection data and the spatial data are calculated as data outcome by the computing means, with the detection step being controlled by the controlling means dependent on a path change of the guide means relative to the wall surface.

Actuation of the detector module can be prevented or the sensor capability can be reduced, respectively, by the controlling means for controlling the detector module dependent on a path change of the guide means relative to the wall surface when the guide means is partially or completely lifted off the substrate, so that erroneous measurements are reliably prevented also without active intervention on the part of the user.

The controlling means are advantageously arranged, together with the computing means, in a common integrated circuit so that the quantity of required components is reduced, it can remain open within the meaning of the present application whether the controlling means are realized as hardware or as software.

The controlling means advantageously acts as a trigger which activates the detector module for a short individual measurement time span (several ms) or increase the sensor capability, respectively, when a movement event is detected by the path sensor, so that the detector module temporarily does not carry out detection measurements when there is no movement event.

The guide means is advantageously formed as a sliding frame which has at least three sliding points that are arranged at a distance from one another over the surface and are formed, for example, as protuberances, bristles or runners, so that the guide means can be guided directly along the wall surface to be analyzed without tilting.

Alternatively, the guide means is advantageously formed as a drive mechanism having at least one rolling element which can roll along the wall surface to be analyzed and which is formed, for example, as a ball, wheel, roller or chain, so that less force needs to be applied by the user to guide the guide means along the to-be-analyzed wall surface.

The drive mechanism advantageously has two guide wheels which are spaced from one another and are oriented parallel to one another. Alternatively, the drive mechanism can have at least one guide chain or guide roller, so that it is possible to roll without slipping exclusively along a guide direction in a straight line, which is required for one-dimensional scanning.

In an advantageous manner, at least two rolling elements, and in a further advantageous manner all of rolling elements, are coupled with one another without a possibility of rotation relative to each other, so that rolling is positively reinforced exclusively along the straight-line guide direction.

The path sensor is advantageously formed as a two-dimensional sensor, for example, as a mechanical mouse sensor or optical CCD camera, so that it is possible to detect the path along any scanning curve.

The path sensor is advantageously formed as an optical sensor, for example, as a CCD camera which is sensitive to surface features of the to-be-analyzed wall surface, so that it is possible to detect the path in a noncontacting manner.

Alternatively, the path sensor is advantageously designed to be sensitive to at least one rolling element, for example, as an incremental sensor (optically, magnetically), an angle transmitter (optically, magnetically), or as a rotational speed sensor (speckle, induction) so that the path is detected independent from the surface features of the to-be-analyzed wall surface.

In an advantageous manner, at least two path sensors are provided, each of which is sensitive to different associated rolling elements which are movable independently from one another, so that a random movement of a rolling elements, for example, due to contact with the user's hand, can be distinguished from a scanning movement along the to-be-analyzed wall surface.

In the control method, the detection step is advantageously controlled by the controlling means depending on the path change detected by at least two independent path sensors, for example, in that the detected scalar individual path changes are multiplied or the logical individual trigger events are AND-linked so that, as a result, the detection step is carried out reliably only during a scanning movement along the to-be-analyzed wall surface.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show.

DETAILED DESCRIPTION OF THE PREFERRED EMBODIMENTS

Figure 1:
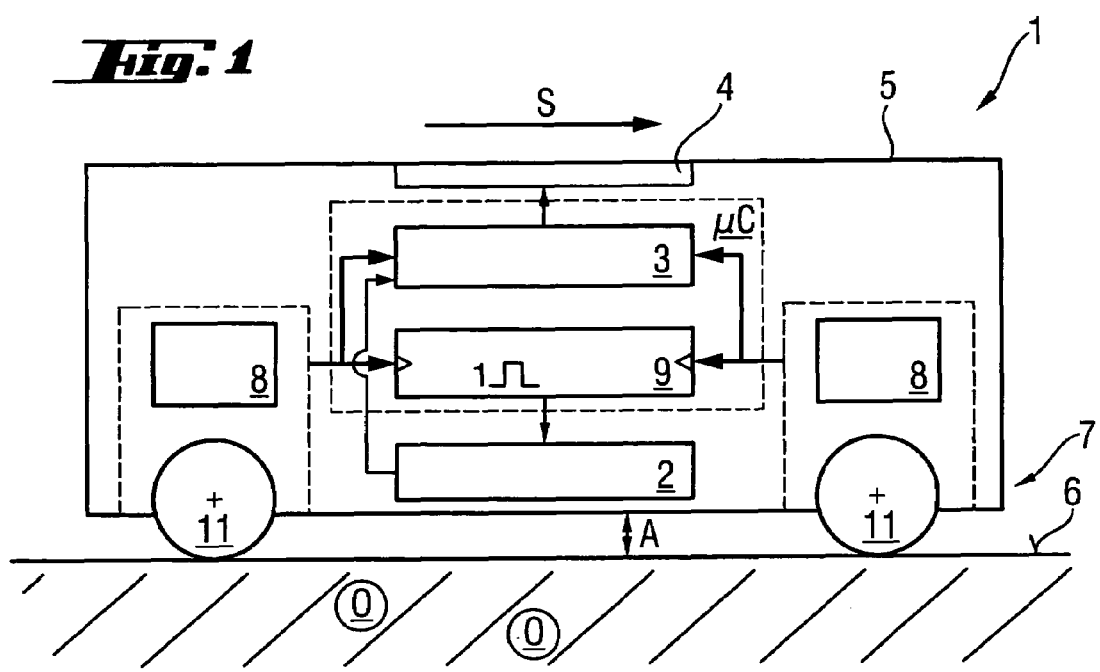
FIG. 1 a schematic side view of a first embodiment of a subsurface detector according to the present invention.

According to FIG. 1, a handheld scanning subsurface detector 1, which is guided along a straight-line scanning direction S and which comprises a detector module 2, computing means 3, and a graphic display 4 within a handheld housing 5, has guide means 7 in the form of a drive mechanism which is designed for guiding the detector module 2 at a distance A over a wall surface 6 which is to be analyzed and in which there are embedded objects O. The guide means 7 has two one-dimensional path sensors 8 which are connected with the computing means 3 and, in a controlling manner via controlling means 9, with a detector module 2. The controlling means 9, which is arranged with the computing means 3 in a common microcontroller μC, is designed as an internal AND-linked trigger which is edge-triggered individually by the path sensors 8, which are designed as incremental path sensor and is constructed as a software-implemented monostable trigger with a time constant of 10 ms. The output of the controlling means 9 is connected in a controlling manner to the detector module 2 and, when the movement event is triggered in this way, initiates an individual detection measurement. A guide wheel 11 is associated in a sensing manner with each of the path sensors 8. The guide wheels 11 are arranged at a distance from each other, are oriented parallel to each other, and are mounted in the guide means 7 for rotation independently from each other.

Figure 2:
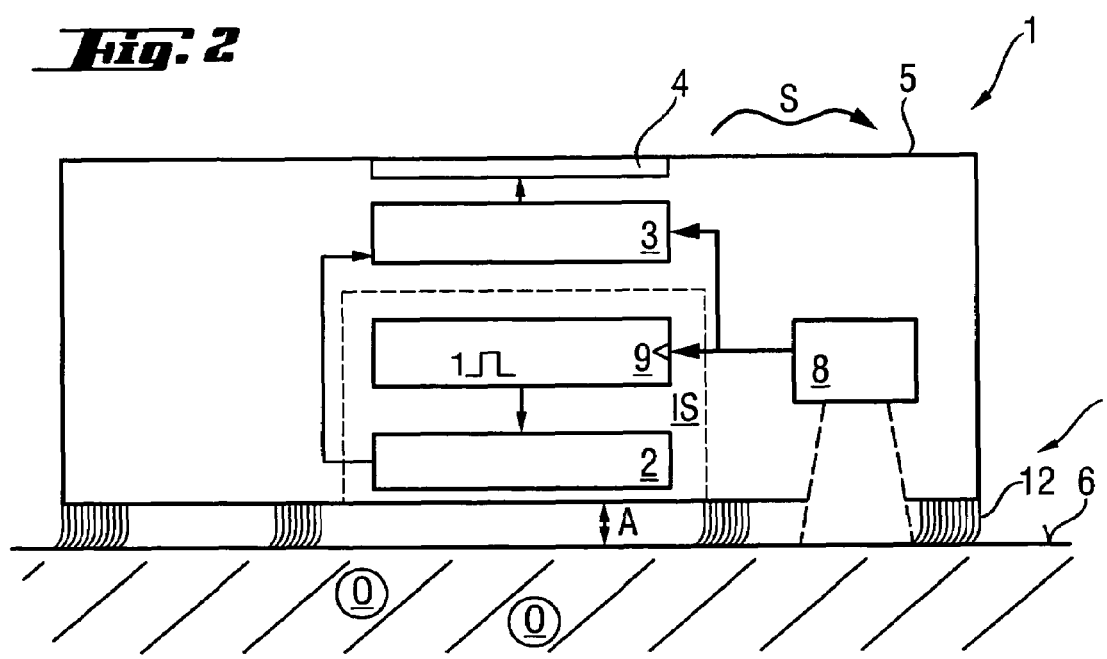
FIG. 2 a schematic side view of another embodiment of a subsurface detector according to the present invention.

According to FIG. 2, a handheld scanning subsurface detector 1, which is guided along any curved scanning direction S and which comprises a detector module 2, computing means 3, and a graphic display 4 within a handheld housing 5, has guide means 7 for guiding the detector module 2 at a distance A over a wall surface 6 which is to be analyzed and in which there are embedded objects O. The guide means 7, in the form of a sliding frame with sliding bristles 12, has an optical two-dimensional path sensor 8 in the form of a CCD camera which is directed through an opening in the housing 5 so as to sense the wall surface 6. The CCD camera is connected to the computing means 3 and, in a controlling manner via controlling means 9, to a detector module 2. The controlling means 9, which forms with the detector module 2 a common integrated circuit, is formed as a trigger in the form of a hardware-implemented monostable multivibrator with a time constant of 10 ms, whose input is connected in a controlling manner directly to the path sensor 8 and whose output is connected in a controlling manner to the detector module 2 and which, when the movement event is triggered in this way, initiates an individual detection measurement.

Figure 3:
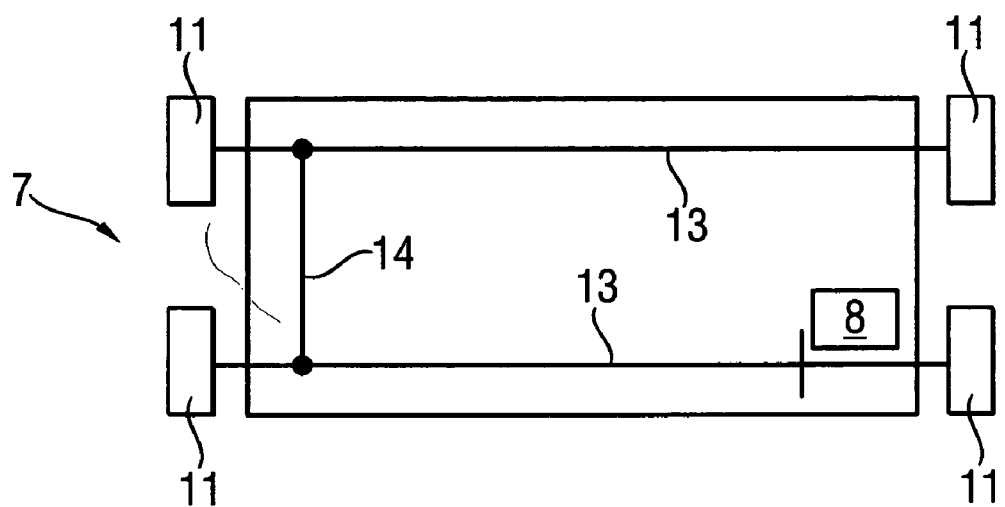
FIG. 3 a schematic top view of a drive mechanism of a further embodiment of a subsurface detector.

According to FIG. 3, the guide means 7, which is alternatively formed as a drive mechanism, has four guide wheels 11, which are arranged at a distance from one another and are oriented parallel to one another, are all coupled with one another, without a possibility of rotation relative to one another, by rigid axles 13 coupled via a toothed belt 14. The path sensor 8, which is formed as a magnetic incremental sensor at an axle 13 is associated, via an axle 13, with the guide wheels 11 in a sensing manner without a possibility of rotation relative thereto.

Figure 4:
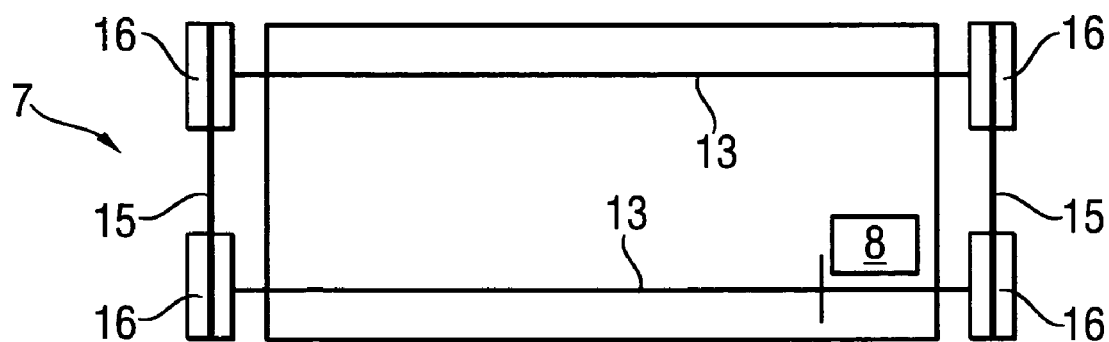
FIG. 4 a schematic top view of a drive mechanism of yet another embodiment of a subsurface detector.

According to FIG. 4, the guide means 7, which is alternatively formed as a drive mechanism, has two guide chains 15 which are oriented parallel to one another at a distance from one another and whose oppositely located chain wheels 16 are coupled with one another in pairs by rigid axles 13, without a possibility of rotation relative to each other. The path sensor 8, which is formed as a magnetic incremental sensor, is associated in a sensing manner via one of the axles 13 with the guide chains 15 without a possibility of rotation relative thereto.

Figure 5:
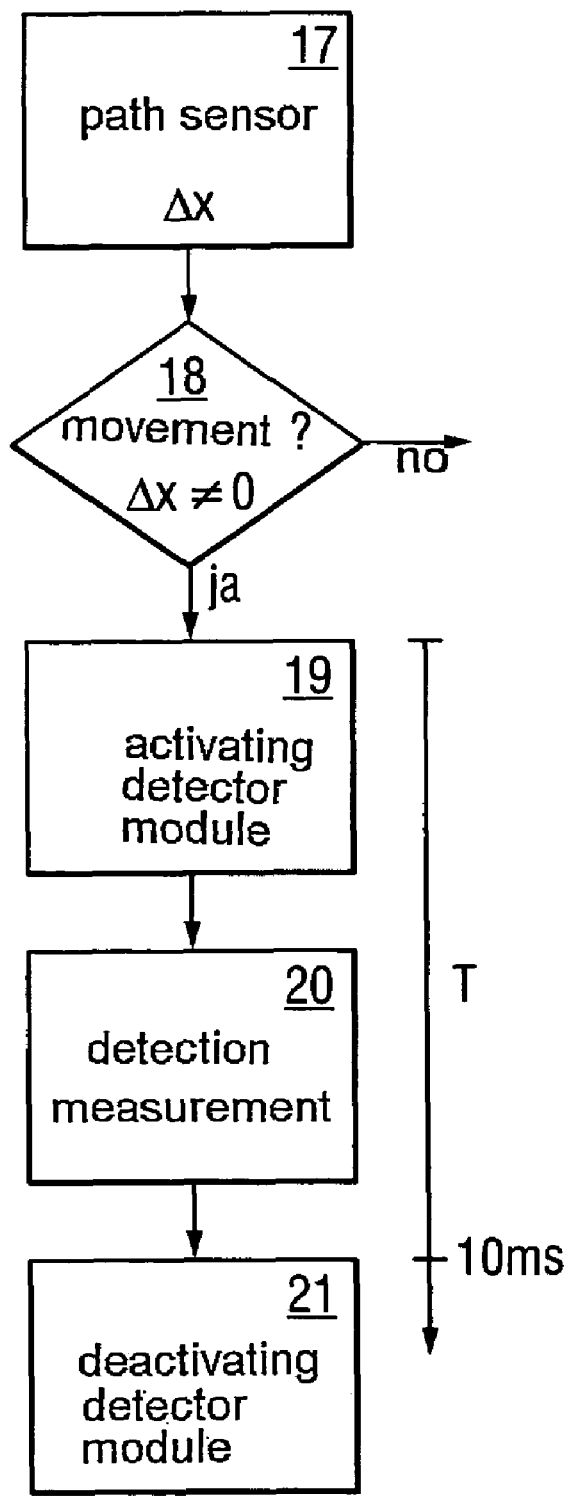
FIG. 5 flowchart of a time-triggered control process.

According to FIG. 5, in the accompanying time-triggered control process, each path change Δx of the guide means which is measured by the incremental path sensor and which, conditional upon a movement 18, represents a logical input signal of the edge-triggered trigger is detected by timely following each other individual steps 17 to 21 of the controlling means, formed as a trigger, in a scanning step 17. The logical output signal, which is synchronized with this input signal and has a time span T of 10 ms, activates at 19 the detector module for this time span T in detection step 20 and enables an individual detection measurement. Accordingly, at the expiration of time span T, the detector module is deactivated at 21 again. This is repeated with the next detected incremental path change Δx.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A handheld scanning subsurface detector, comprising:
   a handheld housing (5);
   a detector module (2) located in the housing (5);
   computing means (3) located in the housing (5);
   guide means (7) for guiding the detector module (2) over a to-be-analyzed wall surface (6) at a predetermined distance therefrom;
   at least one path sensor (8) connected with the computing means (3) for sensing the to-be-analyzed wall surface (6) and a path of the guide means (7) moving over the to-be-analyzed wall surface (6); and
   controlling means (9) connected to the path sensor (8) and to the detector module (2) for responding to the sensing of the to-be-analyzed wall surface (6) by the path sensor (8) to initiate a detection measurement by the detector module (2).

2. A subsurface detector according to claim 1, wherein the controlling means (9) is arranged, together with the computing means (3), in a common microcontroller (μC).

3. A subsurface detector according to claim 1, wherein the controlling means (9) forms, together with the detector module (2), a common integrated circuit (IS).

4. A subsurface detector according to claim 1, wherein the controlling means (9) acts as a trigger which activates the detector module (2) for a short individual measurement time span or to increase the sensor capability.

5. A subsurface detector according to claim 1, wherein the guide means (7) includes a sliding frame which has at least three sliding bristles (12) contacting the surface, with the sliding bristles (12) arranged at a distance from one another over the surface.

6. A subsurface detector according to claim 1, wherein the guide means (7) is formed as a drive mechanism having at least one rolling element which can roll along the to-be-analyzed wall surface (6).

7. A subsurface detector according to claim 6, wherein the drive mechanism comprises two guide wheels (11) arranged at a distance from one another and oriented parallel to one another.

8. A subsurface detector according to claim 6, wherein the drive mechanism comprises at least one guide roller.

9. A subsurface detector according to claim 6, wherein the drive mechanism comprises at least one guide chain (15).

10. A subsurface detector according to claim 6, wherein the drive mechanism comprises a plurality of rolling elements connected with one another without a possibility of rotation relative to each other.

11. A subsurface detector according to claim 10, comprising at least one further path sensor (8), the at least one sensor and the at least one further path sensor being sensitive to different associated rolling elements which are movable independently from one another.

12. A subsurface detector according to claim 6, wherein the path sensor (8) is sensitive to at least one rolling element.

13. A subsurface detector according to claim 1, wherein the path sensor (8) includes a two-dimensional sensor for sensing a two-dimensional curve of the path of the guide means (7) moving over the to-be-analyzed wall surface (6).

14. A subsurface detector according to claim 1, wherein the path sensor (8) includes an optical sensor sensitive to surface features of the to-be-analyzed wall surface (6).

15. A method of detecting objects (O) embedded in a constructional component behind a wall surface (6) with a subsurface detector (1) having a detector module (2), computing means (3), guide means (7) for guiding the detector module (2) over a to-be-analyzed wall surface (6) at a predetermined distance therefrom, at least one path sensor (8) connected with the computing means (3) for sensing the to-be-analyzed wall surface (6) and a path of the guide means (7) moving over the to-be-analyzed wall surface (6), and controlling means (9) connected to the path sensor (8) and to the detector module (2) for responding to the sensing of the to-be-analyzed wall surface (6) by the path sensor (8) to initiate a detection measurement by the detector module (2), the method comprising the steps of:
   repeatedly detecting, in a scanning step (17), a path of the guide means (7), which is measured by the at least one sensor (8) for determining, using spatial data, a position of the detector module (2) at the wall surface (6); and
   effecting, in a detection step (20), detection measurement for detecting, using detection data, the embedded objects (O) before the spatial data and the detection data are calculated as a data outcome by the computing means (3), wherein the detection step (20) is controlled by controlling means (9) dependent on a path change (Δx) of the guide means (7) relative to the wall surface (6).

16. A detecting method according to claim 15, wherein the detection step (20) is controlled by the controlling means (9) dependent on the path change (Δx) detected by at least two independent path sensors (8).

* * * * *